April 20, 1948. P. POOTJES 2,439,861
ALTERNATE TIPPING VALVE FOR HANDLING FLUENT MATERIALS
Filed Jan. 2, 1945 4 Sheets-Sheet 1

INVENTOR.
PETER POOTJES
BY
ATTORNEY

April 20, 1948. P. POOTJES 2,439,861
ALTERNATE TIPPING VALVE FOR HANDLING FLUENT MATERIALS
Filed Jan. 2, 1945 4 Sheets-Sheet 3

INVENTOR.
PETER POOTJES
BY
ATTORNEY

INVENTOR.
PETER POOTJES
BY
ATTORNEY

Patented Apr. 20, 1948

2,439,861

UNITED STATES PATENT OFFICE 2,439,861

ALTERNATE TIPPING VALVE FOR HANDLING FLUENT MATERIALS

Peter Pootjes, Temple City, Calif., assignor to Western Precipitation Corporation, Los Angeles, Calif., a corporation of California Application January 2, 1945, Serial No. 571,086

2 Claims. (Cl. 222—445)

1

This invention relates to alternate tipping valves for handling fluent or mobile materials. The valve of the present invention is designed to handle the dusts collected in cyclone dust separators and the like, but as will be apparent may be used in a variety of situations for handling, e. g. feeding or discharging, all sorts of mobile materials such as dusts or powders, granular materials and even liquids.

An object of the invention is to provide a valve of the alternate tipping type in which the closure members are so mounted as to permit limited tilting movement thereof with respect to their seats to assure tight seating.

Another object of the invention is to provide operating mechanism capable of operation in either forward or reverse direction so that accidental reverse operation will not result in damage.

Another object of the invention is to provide a valve in which the operating mechanism is protected against high temperatures in the event that the material being handled is at a high temperature and against contact with the material being handled.

A further object of the invention is to provide a valve mechanism in which the closure members are held in closed position by a single spring so arranged as to increase the force holding one member in closed position while the other member is in open position.

Other objects and advantages of the invention will appear from the following detailed description of the invention and illustrative embodiments.

It will be understood that an alternate tipping valve is one in which the movement of a mobile material through a conduit is controlled by two spaced closure members which generally are operatively connected to each other in such a way that at least one member is always closed. In the valve of the present invention, this object is attained by the use of suitably designed cam mechanism.

A preferred embodiment of the invention and certain modifications thereof and diagrammatic views showing the operation of the valve are illustrated in the accompanying drawings in which.

Figure 5:
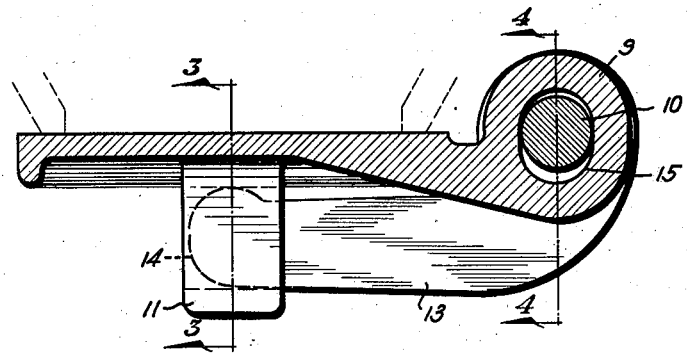
Fig. 5 is a section on the line 5—5 of Figs. 3 and 4.
Figure 4:
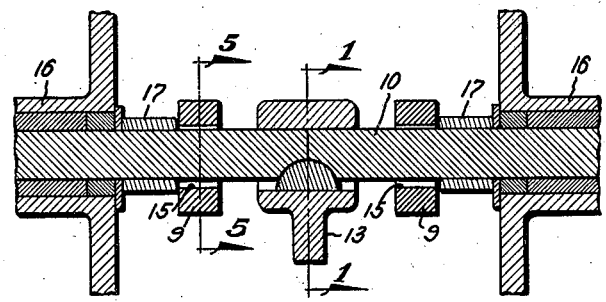
Fig. 4 is a section on the line 4—4 of Fig. 5.

Referring to the drawings, 1 is the valve conduit which may be of rectangular, circular or other suitable cross sectional shape. It is provided with flanges 2 and 3 for attachment respectively to, e. g., a bin from which material is to be discharged and a vessel into which the material is to be delivered but it will be understood that other suitable attaching means may be substituted for these flanges. The conduit is provided with two spaced apart inwardly and downwardly extending projections 4 and 5, the lower edges of which form the valve seats. 6 and 7 are the valve closure members. Each valve closure member consists of a flat plate reinforced and stiffened by the marginal bead or thickening 8, two integral hinge members 9, 9 by means of which each closure member is hinged to one of the shafts 10 and the projection or yoke 11 provided with the opening 12 for receiving the substantially cylindrical end 14 of one of the arms 13 each of which is keyed to and turns with one of the shafts 10. Referring to Figs. 4 and 5, it will be seen that the openings 15 in hinge members 9 are not exactly circular but are slightly elongated in the direction perpendicular to the plane of the closure member to permit movement of the members 9 with respect to the shafts 10. Thus the closure members 6 and 7 may tilt or rock slightly with respect to shafts 10 in order to accommodate their bearing faces to the seats 4 and 5. As will be apparent, each valve closure member may tilt about an axis parallel to the shaft 10 or about an axis perpendicular to the shaft 10, or both, that is, in any direction about the point of intersection of said two axes. The end 14 of the arm 13 fits sufficiently loosely in the opening 12 of the yoke 11 to permit the tilting movement provided for by the enlarged openings in the hinge members 9, 9.

Figure 1:
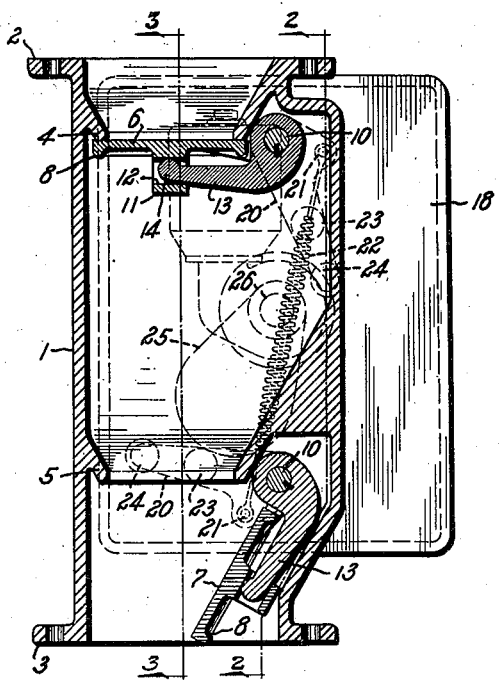
Fig. 1 is a vertical section on the line 1—1 of Figs. 2, 3 and 4.
Figure 3:
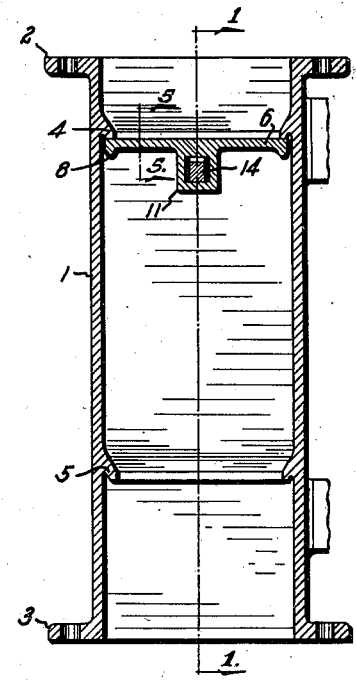
Fig. 3 is a vertical section on the line 3—3 of Figs. 1 and 5.
Figure 2:
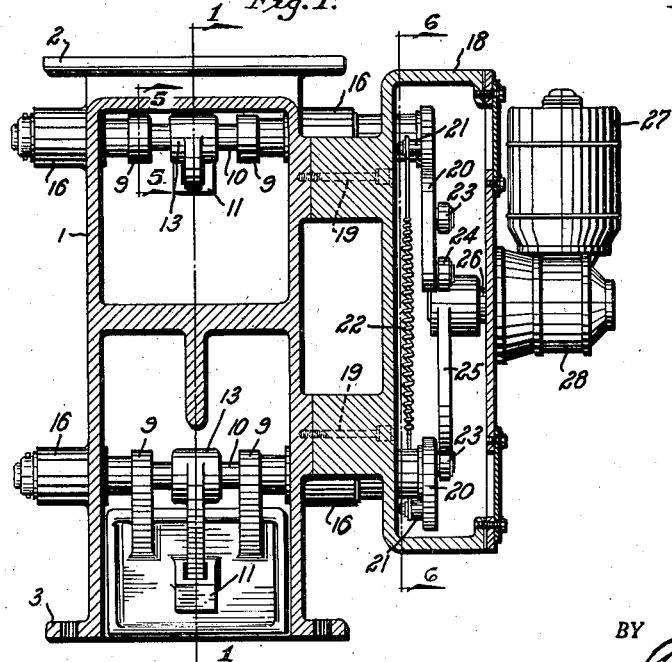
Fig. 2 is a vertical section on the line 2—2 of Figs. 1 and 6.

The arms 13 are keyed to and turn with the shafts 10 as shown in Figs. 1 and 4. As shown in Figs. 2 and 4, the ends of shafts 10 extend through bearings 16 carried by opposite walls of the conduit 1. The valve closure members are held in alignment with their seats by the sleeves 17 on the shafts 10.

The mechanism for opening and closing the valves is enclosed in and supported by the housing 18 which is supported on the conduit 1 by the bolts 19. Shafts 10 extend into the housing 18 and carry the two crank arms 20. Each crank arm is provided with a projection 21 for attachment of the spring 22. Each crank arm 20 also carries two rollers 23 and 24 which are engaged by the cam 25 carried on the shaft 26 which latter is driven by the motor 27 through the speed reducing mechanism 28. This arrangement of the valve operating mechanism in a separate closed compartment protects it against high temperatures in the event that the dust and gases being handled are hot, and also protects the cam and rollers and other moving parts against dust.

Figure 6:
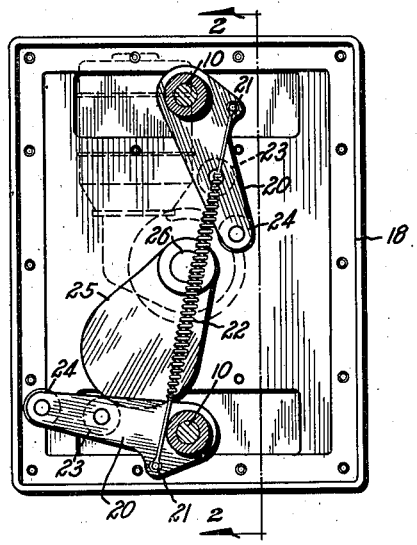
Fig. 6 is a section on the line 6—6 of Fig. 2.
Figure 11:
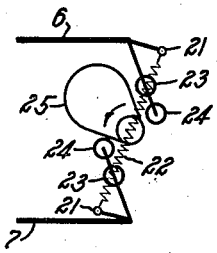
Figs. 11 to 14 are diagrammatic views showing the operation of the closure members as the cam is turned counterclockwise.

As can be seen best by reference to Fig. 6, shaft 26 and cam 25 are located between operating arms 20 so that cam 25, upon rotation, engages the operating arms in succession. The axes of shafts 10 and shaft 26 preferably lie in, or substantially in, a single vertical plane, which is parallel to the vertical axis of conduit 1. This design not only makes for simplicity in manufacture but contributes to proper operation when cam 25 is reversed, as described below.

Figure 7:
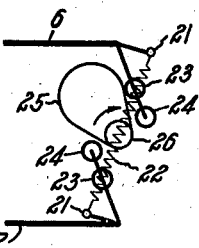
Figs. 7 to 10 are diagrammatic views showing the operation of the closure members as the cam rotates clockwise.
Figure 12:
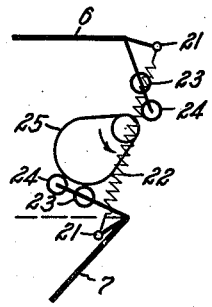
Figure 8:
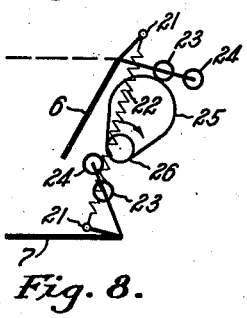
Figure 9:
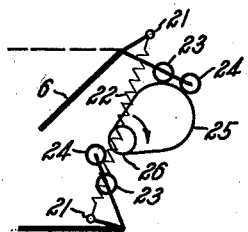
Figure 13:
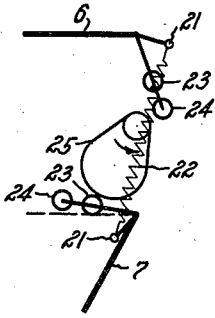
Figure 10:
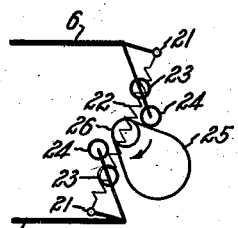
Figure 14:
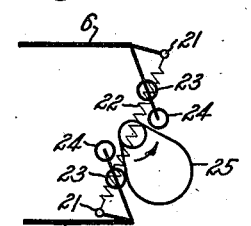

The operation of the apparatus illustrated in Figs. 1 to 6 is shown in Figs. 7 to 10. Fig. 7 shows the valve closure members in closed position and the cam 25 rotating clockwise and engaging the roller 23 on crank arm 20 of closure member 6. As the cam moves clockwise to the position shown in Fig. 8, closure member 6 is pushed open against the action of the spring 22. This movement increases the tension on the spring and serves to hold closure member 7 more firmly closed while closure member 6 is opening. Cam 25 moves farther clockwise to the position shown in Fig. 9 where it engages roller 24 of closure member 6 and the latter then starts its closing movement. In Fig. 10, the cam has moved to neutral position opposite that shown in Fig. 7 and both closure members are closed. As will be apparent, as the cam 25 continues to move in clockwise direction to its starting position shown in Fig. 7, it will open and then close closure member 7 while leaving closure member 6 closed.

The use of two rollers 23 and 24 on the crank member 20 permits the use of a gently curved cam surface while at the same time securing a quick opening and closing of the valves with a relatively long period in open position. In this connection, it is noted that the device normally is operated or intended for operation so as completely to discharge the amount of dust accumulated above the closure member 6 at each opening. However, in case the amount of material to be handled is greater than can be discharged by the normal opening and closing of the valves by the action of the cam, the material will tend to hold the valves open against the action of the spring 22 and to continue to flow until any accumulation is exhausted. It is noted that closure members 6 and 7 are positively opened by the cam 25 but the cam does not act to close them. The closing of the valves is done by the spring 22 and its tension as well as the weight of the closure members 6 and 7 and the location of projections 21 may be so determined with respect to the weight of the material being handled that the valves will remain closed against a normal accumulation of material which may be discharged by the normal opening and closing of the valves but will be forced open and permit the material to flow through the valves when a substantial excess accumulation occurs. Thus the closing of the conduit, normally effected by the closure members, will be effected by the solid stream of material flowing through the conduit. On the other hand, the tension of the springs 22 may be such as to close the valves regardless of the presence of an excess of material to be discharged.

An important feature of the apparatus as will be seen from Figs. 11 to 14 is that the cam may inadvertently be turned counterclockwise without damage or breakage, and in order to permit this reversible action the cam is preferably symmetrical, or substantially so, about the maximum radius of the cam. The valves will be opened and closed and the apparatus will function although not with the same timing of the opening and closing of the closure members as when the cam rotates clockwise. The shape and location of the cam 25 and the position of the rollers 23 and 24 could of course be arranged so that the operation of the valves would be identical in both directions of movement of the cam. It is preferred, however, to arrange the parts as illustrated so as to obtain a quick opening and closing of the closure members with a relatively long full open period when the cam is moved in one direction while keeping the machine operable in the other direction. In the specific embodiment illustrated, the cam is so shaped and positioned as to release the closure member completely as it approaches its closed position. This permits a snap closing of the valve and assures a good seating of the closure member. As will be apparent, the length of the free swing of the closure member to closed position may be varied as desired, in order to vary the force of the snap closure, by changing the shape of the cam. Thus by varying the shape of that portion of the cam which engages the roller 24 during the closing of the closure member, the roller may be made to ride the cam to closed position or it may be released at full open or at any other intermediate position and permitted to snap to closed position. The snap closing of the closure members cooperates with the loose mounting thereof on shafts 10 to give a tight seating of the closure members.

The single spring 22 might be replaced by two separate springs, one for each valve, but in such an arrangement the normal tendency is to increase the tension on the spring as the valve is opened and to decrease the tension tending to hold the valve closed. By the use of a single spring, the tension and leverage holding one closure member closed while the other is open is desirably increased and at the same time the pressure of the cam surface on the rollers of the open valve is reduced thus reducing the wear on the cam surface and rollers.

It will be observed from Figs. 7 to 10 that when cam 25 rotates clockwise it first engages roller 23 and then roller 24 in each of arms 20. When the cam rotates counter-clockwise, as in Figs. 11 to 14, the sequence of engagement is reversed and roller 24 is engaged first, then roller 23 on each arm 20.

Figure 15:
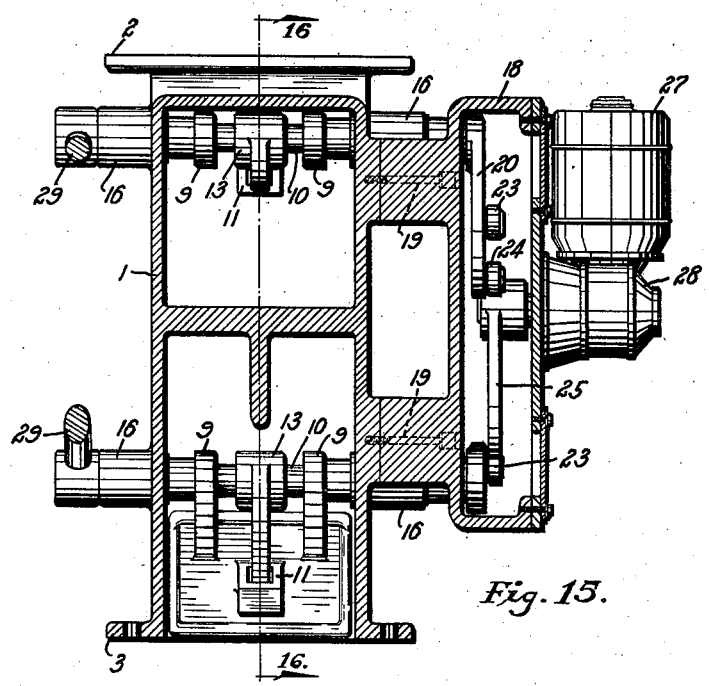
Fig. 15 is a vertical section similar to Fig. 1 of a modified form of valve operating mechanism on the line 15—15 of Fig. 16.
Figure 16:
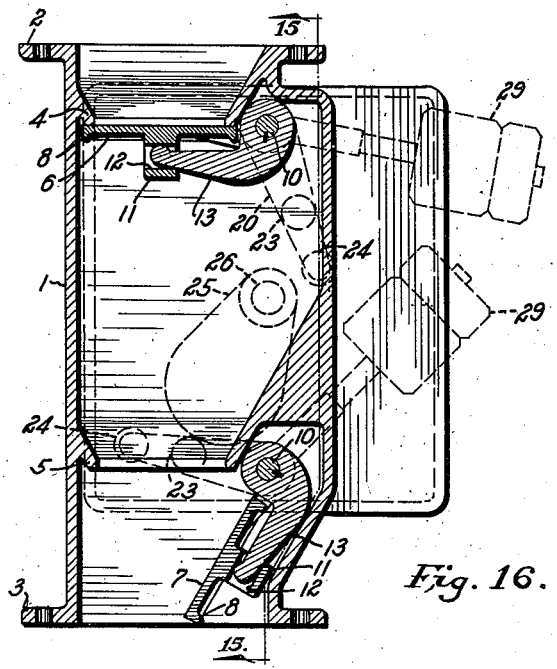
Fig. 16 is a vertical section on the line 16—16 of Fig. 15.

The modified form of apparatus illustrated in Figs. 15 and 16 substitutes counterweights for the spring 22 of the form of apparatus illustrated in Figs. 1 to 14.

Referring to Figs. 15 and 16, all parts are similar to those of the apparatus illustrated in Figs. 1 to 14 excepting that the spring 22 and its supporting projections 21 are omitted and shafts 10 are extended to receive the weight arms 29 which are keyed to and turn with shafts 10. Weight arms 29 are set at such angles with respect to the shafts 10 and the closure members 6 and 7 as to exert maximum pressure on the closure members when they are in closed position.

The means for driving the valve operating mechanism, i. e., the motor 27 and the speed reducing gearing 28 may, if desired, include a clutch which will slip in the event that the valve becomes clogged and thus prevent damage to the valve. Moreover, the clutch may, if desired, be a one way clutch so as to assure that the cam will be driven only in the desired direction.

I claim:

1. In an alternate tipping valve comprising a material conveying conduit; two valve seats in the conduit spaced axially thereof; two valve closure members each hinged to swing between open and closed positions with respect to one of said seats; an arm connected to each valve closure member; and a rotating cam engageable with said arms for alternately opening and closing said valves, the improvement which consists in that: the operating arms are substantially parallel to each other when the valve closure members are closed against the seats; a first and a second cam follower are located on each operating arm; and the rotating cam is located between the operating arms in a position to engage the first and then the second follower in sequence on each arm upon rotation in one direction and to engage the second and then the first follower in sequence on each arm upon rotation in the opposite direction, to move the valve closure members alternately through similar cycles of opening and closing.

2. An alternate tipping valve as in claim 1 in which the rotating cam is substantially symmetrical about its maximum radius.

PETER POOTJES.

REFERENCES CITED

The following references are of record in the file of this patent:

UNITED STATES PATENTS

| Number | Name | Date |
| --- | --- | --- |
| 446,059 | Crawford | Feb. 10, 1891 |
| 755,284 | Dixon | Mar. 22, 1904 |
| 1,414,870 | Fisher | May 2, 1922 |
| 1,699,085 | Vera | Jan. 15, 1929 |
| 1,875,591 | Green | Sept. 6, 1932 |
| 1,969,091 | Miles | Aug. 7, 1934 |
| 2,021,053 | Englebright | Nov. 12, 1935 |
| 2,043,318 | Conley | June 9, 1936 |

FOREIGN PATENTS

| Number | Country | Date |
| --- | --- | --- |
| 6,336 | Great Britain | 1909 |